(12) United States Patent
Yang et al.

(10) Patent No.: US 12,358,414 B2
(45) Date of Patent: Jul. 15, 2025

(54) ELECTRIC PUSH ROD AUTOMOBILE LIFTING TAILGATE SYSTEM

(71) Applicant: NINGBO POWERNICE INTELLIGENT TECHNOLOGY CO., LTD., Ningbo (CN)

(72) Inventors: Yong Yang, Ningbo (CN); Mengliang Wei, Ningbo (CN); Peng Lu, Ningbo (CN); Fernando Osca, Ningbo (CN)

(73) Assignee: NINGBO POWERNICE INTELLIGENT TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/807,697

(22) Filed: Aug. 16, 2024

(65) Prior Publication Data
US 2025/0058691 A1    Feb. 20, 2025

(51) Int. Cl.
*B60P 1/44*    (2006.01)
(52) U.S. Cl.
CPC ........... *B60P 1/4414* (2013.01); *B60P 1/4471* (2013.01)
(58) Field of Classification Search
CPC ..... B60P 1/4414; B60P 1/4471; B60P 1/4442; B60P 1/4478; B60P 1/4492
USPC ...................................................... 414/557
See application file for complete search history.

(56) References Cited

U.S. PATENT DOCUMENTS

| | | | | |
|---|---|---|---|---|
| 4,147,261 A | * | 4/1979 | Dautel .................. | B60P 1/4414 414/557 |
| 5,100,282 A | * | 3/1992 | Maier .................... | B60P 1/4414 414/545 |
| 5,941,677 A | * | 8/1999 | De Boer ............... | B60P 1/4414 414/557 |
| 2010/0047048 A1 | * | 2/2010 | Zimmermann ....... | B60P 1/4471 414/540 |

FOREIGN PATENT DOCUMENTS

| | | | | | |
|---|---|---|---|---|---|
| CN | 110979136 A | * | 4/2020 | ............ | B60P 1/4471 |
| EP | 1020324 A1 | * | 7/2000 | ............ | B60P 1/4414 |

* cited by examiner

*Primary Examiner* — James Keenan
(74) *Attorney, Agent, or Firm* — Ming Jiang; OPENPTO US LLC (57) ABSTRACT

This application discloses an electric push rod automobile lifting tailgate system featuring an independent door push rod mechanism that separates the tailgate's opening/closing actions from its lifting/lowering functions. The system includes a large beam assembly, a follower arm, a lifting beam, and a bearing platform that is rotatably attached to a lifting seat. The system also incorporates a multi-link mechanism for enhanced stability, a cylindrical cam mechanism to prevent tipping at higher positions, and an indirect ground detection mechanism for precise control on various terrains. The door push rod operates independently from the lifting mechanism, reducing mechanical stress and improving durability. Additionally, the system features a dual-function connecting plate that aligns the bearing platform with the vehicle compartment at higher positions and acts as a safety barrier during loading at lower positions, ensuring secure and efficient operation.

15 Claims, 12 Drawing Sheets

ELECTRIC PUSH ROD AUTOMOBILE LIFTING TAILGATE SYSTEM

CROSS-REFERENCES

This application claims priority to and the benefit of the following patent applications: Chinese patent application No. 202311426772.7, filed on Oct. 31, 2023, titled "Automobile Tailgate with Electric Push Rod", Chinese patent application No. 202322513102.0, filed on Sep. 15, 2023, titled "Automobile Tailgate with Buffer Support", Chinese patent application No. 202410467050.4, filed on Apr. 18, 2024, titled "Follower Automobile Tailgate Cylindrical Cam Latch Mechanism", Chinese patent application No. 202311051403.4, filed on Aug. 17, 2023, titled "Automobile Tailgate with Independent Door Cylinder", and Chinese patent application No. 202410622029.7, filed on May 20, 2024, titled "Indirect Ground Detection Method for an Electric Follower Automobile Tailgate." The disclosures of these applications are incorporated herein by reference in their entirety.

TECHNICAL FIELD

The present invention relates to the technical field of automobile tailgates, specifically to an electric push rod automobile lifting tailgate system.

BACKGROUND

With the development of the logistics industry, the demand for vehicle tailgates has been increasing. Traditional automobile tailgates operate by using a booster cylinder to drive the door push rod for the "lifting" action. However, the dynamic load required by the flipping cylinder is significantly greater than that needed for opening and closing the tailgate, which results in higher power and strength requirements for the flipping cylinder, consequently increasing the product's cost and weight. Additionally, the use of booster cylinders adds to the tailgate's weight and cost, complicates the hydraulic circuit, increases the number of pipe joints, and raises the risk of oil leakage.

An existing technology utilizes a follow-up plate mechanism to perform the lowering and lifting actions of the tailgate, eliminating the need for a booster cylinder. This mechanism consists of components such as the frame, follow-up plate, lifting plate, door closing cylinder, lifting cylinder, load-bearing platform, buffer wheel, and others. The follow-up plate is hinged at the top with the frame, at the middle with the lifting arm, and at the bottom with the lifting cylinder. During the process of the tailgate's up and down movements, the follow-up plate adheres closely to the frame, ensuring that the angle of the load-bearing platform remains unchanged.

However, the follow-up structure poses a risk during the lifting process. The load-bearing platform is subject to a decomposed gravitational load which can lead to the tilting and potential toppling of the platform if not properly managed. The traditional follow-up solution also imposes significant static pressure on the door closing cylinder during the lifting process, resulting in design inefficiencies and increased manufacturing requirements.

To address these issues, some designs replace the hydraulic cylinder with an electric push rod. However, electric push rods have higher passive resistance, and the tailgate's self-weight cannot automatically shorten the push rod when the tailgate is unloaded, necessitating a ground contact trigger mechanism to control the stopping of the tailgate.

SUMMARY

The present patent application discloses an innovative automobile lifting tailgate system designed to enhance the functionality, safety, and efficiency of tailgate operations. The system includes a large beam assembly configured to be fixed on an automobile, providing a robust framework for the other components. A follower arm, hinged to the large beam assembly, guides the movement of the tailgate, while a lifting beam is connected to the follower arm to facilitate lifting operations. The system further includes a bearing platform. This bearing platform is rotatably attached to a lifting beam or resting against to the lifting seat, enabling the independent control of the tailgate's opening/closing and lifting/lowering actions.

The tailgate's closing function is managed by a door push rod, hinged to a fixed beam, and operates independently from the lifting mechanism. The door push rod is designed to engage a coaxial hole shared with the fixed beam, allowing it to remain stationary during lifting and lowering operations, thus reducing mechanical stress. The bearing platform is divided into two sections: the new bearing platform and the lifting seat, which can rotate and separate, existing in connected or disconnected states as required. This configuration allows for seamless and independent operation of the tailgate's various functions.

To enhance stability, the system incorporates a cylindrical cam mechanism that converts the rotational movement of the fixed beam into the linear movement of a locking pin. This pin engages with the follower arm to prevent the bearing platform from tipping when the tailgate is raised to a higher position. The system also includes an indirect ground detection mechanism that stops the tailgate's movement by detecting when the follower arm reaches its maximum angle, ensuring accurate control regardless of ground conditions.

Additional features include a dual-function connecting plate that aligns the bearing platform with the vehicle compartment at higher positions and acts as a barrier at lower positions to prevent cargo from sliding off. The system also integrates a smart sensor system in the lifting rod to monitor load distribution and adjust lifting parameters accordingly, and a multi-link mechanism associated with the follower arm to stabilize the tailboard and prevent tipping at lower positions. The door push rod is further equipped with an automatic locking mechanism, integrated with the vehicle's central locking system, to secure the tailgate when fully closed. Overall, this patent application presents a comprehensive and versatile tailgate system that significantly improves the functionality and safety of automobile tailgate operations.

DETAILED DESCRIPTION

These and other objects, features and advantages of the present disclosure will become better understood with the following preferred embodiments, accompanying drawings and description in detail.

Figure 1:
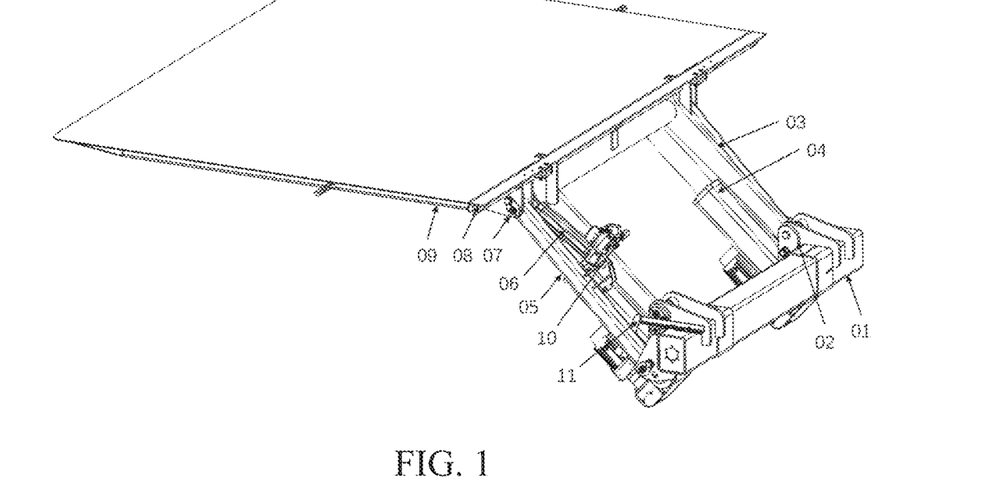
FIG. 1 is a perspective view of the electric push rod automobile lifting tailgate provided by the embodiment of the present invention.

As shown in FIG. 1, an automobile lifting tailgate system includes several key components that work together to perform lifting and lowering operations. These components include a large beam assembly (01), a follower arm (02) that guides the movement, a lifting beam (03) connected to the follower arm, and a lifting rod (04) that drives the lifting action. The fixed beam (05) provides structural support, while the door push rod (06) manages the opening and closing of the tailgate. A lifting seat (07) offers additional support, and the connecting plate (08) ensures a stable connection between the bearing platform (09) and the vehicle compartment. The system also features a lifting trigger (10) that signals when the tailboard is at the correct height and a ground contact trigger (11) that controls the system based on the tailboard's position relative to the ground.

Figure 2:
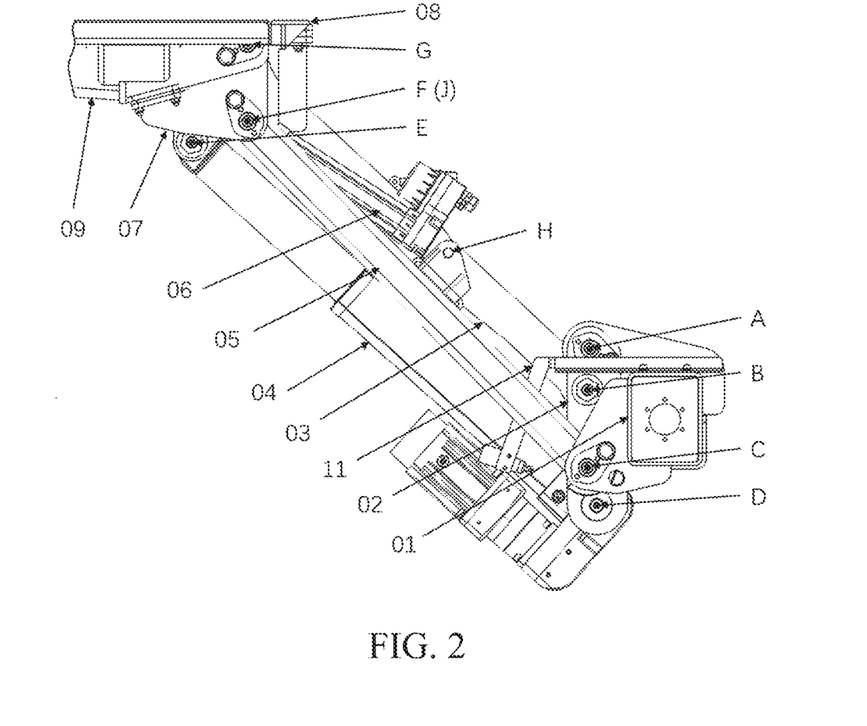
FIG. 2 is a schematic diagram of the connection relationship between components of the electric push rod automobile lifting tailgate provided by the embodiment of the present invention.

As shown in FIG. 2, the components are connected as follows: The top end of the follower arm (02) is hinged to point A on the large beam assembly (01), allowing it to pivot. The lifting beam (03) is hinged at an end thereof to the follower arm (02) at point B, enabling it to rotate as the follower arm moves. The fixed beam (05) is hinged to point C on the large beam assembly (01), providing a stable attachment point. The base of the lifting rod (04) is hinged to the lower end of the follower arm (02) at point D, while its extendable end is connected to the lifting beam (03) at point E. The fixed beam (05) and the lifting seat (07) are connected at point F. The bearing platform (09), lifting beam (03), and lifting seat (08) are jointly hinged at point G. The door push rod (06) is attached to the middle of the fixed beam (05) at point H, and its extendable end is hinged to the bearing platform (09) at point J. When the bearing platform is in contact with the lifting seat, points J and F become coaxial, ensuring stability during operation. The bearing platform (09) pivots around point G and is supported by the platform support plate (73) to achieve the lifting and lowering actions. The opening and closing of the door are achieved by the extension and retraction of the door push rod (06), which also pivots around point G. The connecting plate (08) is fixedly attached to the lifting beam (03), and when the tailboard is lifted, the upper surfaces of the connecting plate and bearing platform align, providing a smooth transition. The lifting trigger (10) is adjustable and is fixed to the truck body, while the ground contact trigger (11) is adjustable and attached to the large beam assembly (01), ensuring proper operation based on the tailboard's position.

Figure 3:
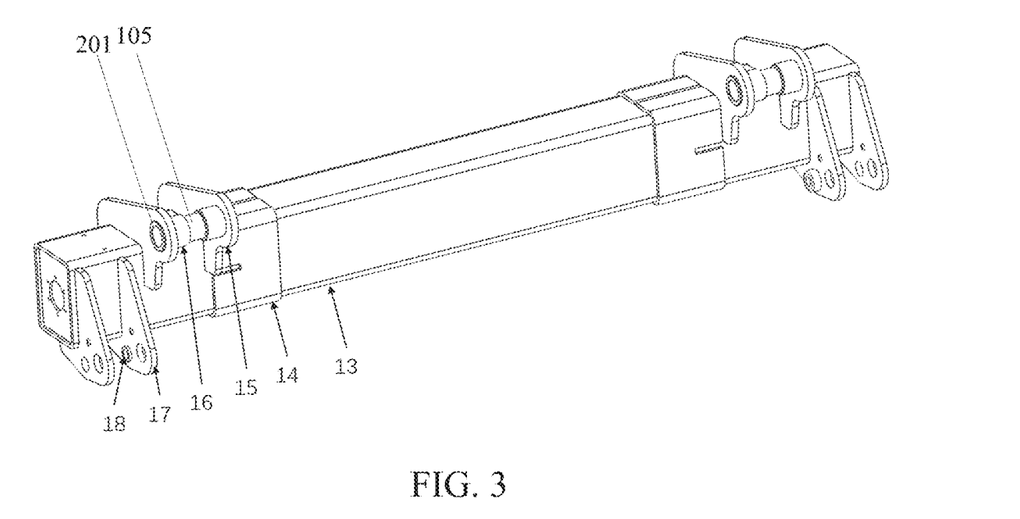
FIG. 3 is a structural schematic diagram of the large beam assembly.

As shown in FIG. 3, the large beam assembly (01) is a crucial structural component that provides a stable foundation for the other parts. It includes several elements that are fixedly welded together for strength and stability: the square beam (13), which serves as the main support; the reinforcement sleeve (14) that strengthens the assembly; the follower installation plate (15) where the follower arm (02) is mounted; the connecting tube (16) that connects different parts of the assembly; the fixed beam installation plate (17) that attaches the fixed beam (05); and the pin shaft sleeve (18) that holds the pin shaft (85) securely in place. The entire assembly is designed symmetrically from left to right, with four fixed beam installation plates (17) located on the outermost sides for balanced support.

Figure 4:
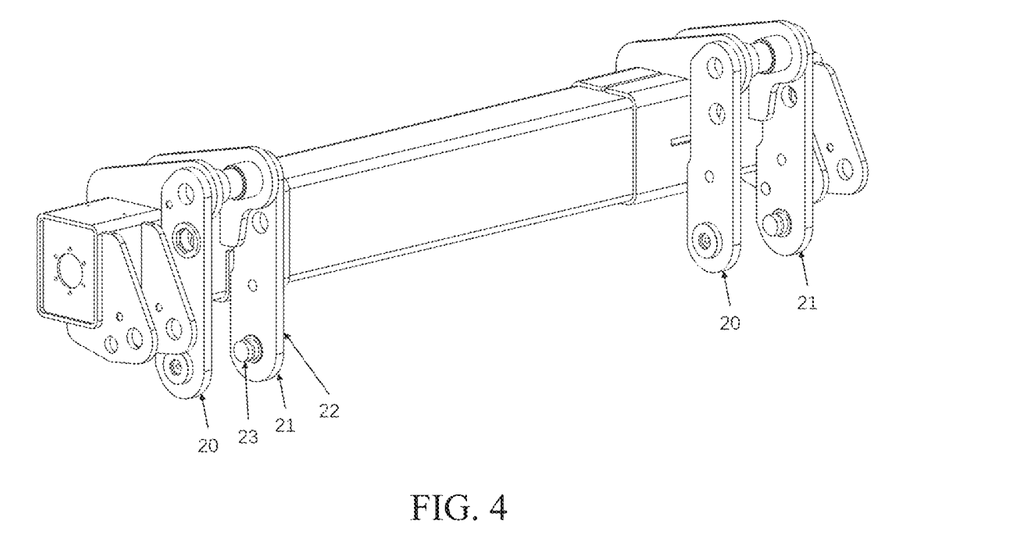
FIG. 4 is a structural diagram of the follower arm.
Figure 6:
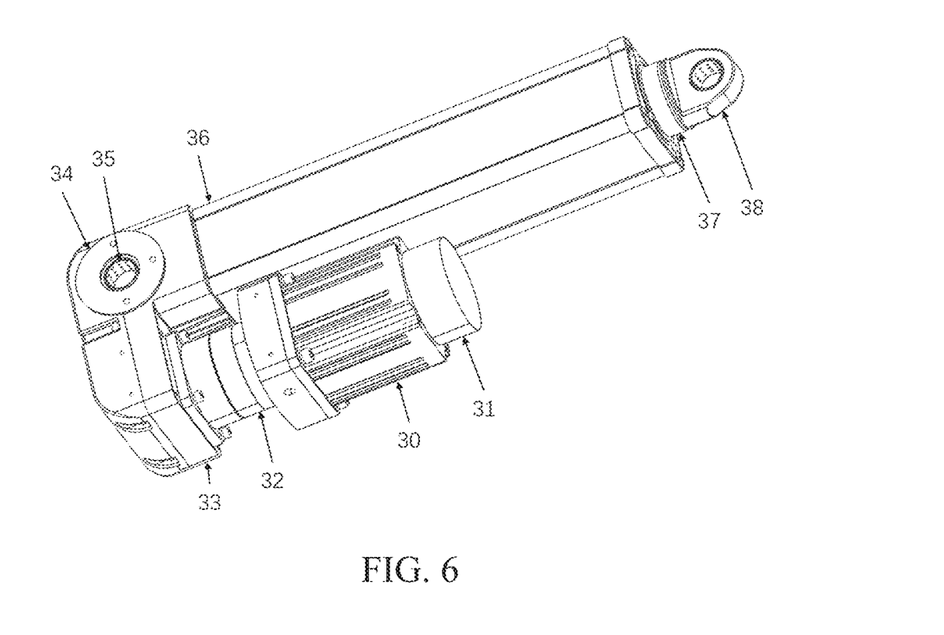
FIG. 6 is a composition diagram of the lifting rod.

As shown in FIG. 4, the follower arm (02) is composed of two outer follower arms (20) and two inner follower arms (21). The outer follower arms (20) are positioned on the outside of the follower installation plates (15), while the inner follower arms (21) are situated inside. The top circular hole (201) of the follower arm (02) is hinged to the connecting tube (16) using a hinge shaft (105), allowing for rotational movement. As illustrated in FIG. 6, the inner side of the follower arm (02) makes contact with the square beam (13) and the reinforcement sleeve (14), which prevents it from rotating clockwise, but it can rotate counterclockwise. The outer and inner follower arms are fixedly welded to the follower installation plate (15) and the short shaft (23), with the short shaft (23) oriented toward the center of the arm assembly, ensuring structural integrity and movement control.

Figure 5:
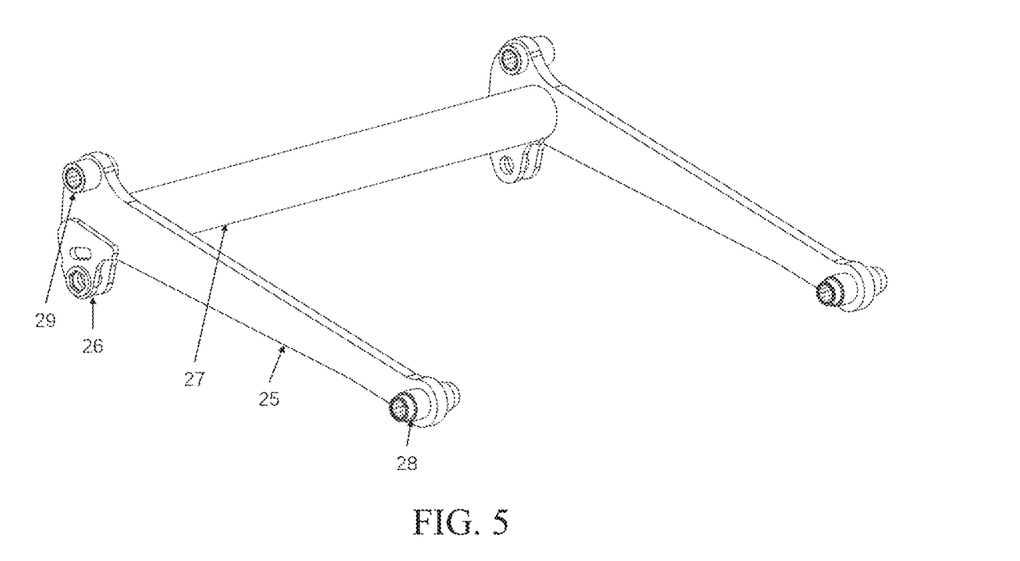
FIG. 5 is a composition diagram of the lifting beam.

As shown in FIG. 5, the lifting beam (03) is a critical component that connects various parts of the tailgate mechanism. It consists of the lifting plate (25), which supports the lifting actions; the push rod connection plate (26), where the lifting rod (04) connects; the connecting tube (27), which provides a structural link between components; the follower connection sleeve (28), which allows the lifting beam (03) to connect to the follower arm (02); and the platform connection sleeve (29), which attaches the lifting beam (03) to the bearing platform (09). All these elements are fixedly welded together, ensuring a strong and reliable structure.

Figure 7:
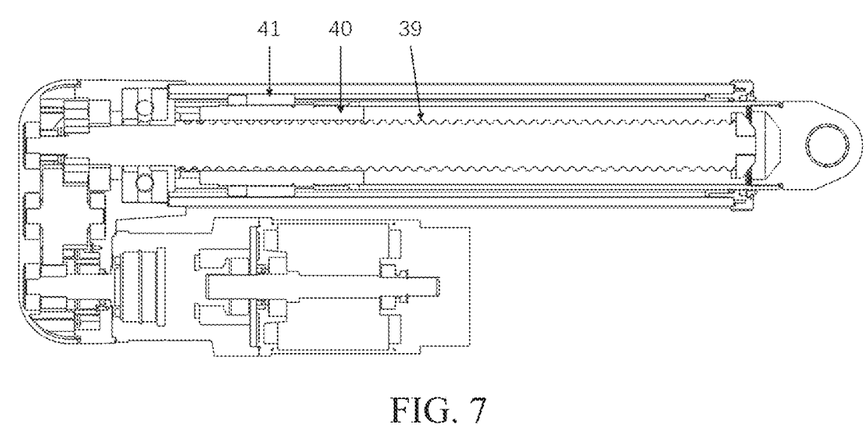
FIG. 7 is a sectional view of the lifting rod.

As shown in FIGS. 6 and 7, the lifting rod (04) is a complex assembly that drives the lifting mechanism. It includes the lifting motor (30), which provides the power; the electromagnetic brake (31), which locks the motor shaft when the power is cut off; the planetary reducer (32) and reduction box (33), which reduce the motor's speed and increase torque; the wear-resistant plate (34), which reduces friction and wear; the shaft sleeve (35), which houses the moving parts; the outer tube (36) and inner tube (37), which telescope to allow for extension and retraction; the front-end joint (38), which connects to the lifting beam (03); the ball screw (39) and screw nut (40), which convert rotational motion into linear movement; and the stop ring (41), which limits the movement of the screw nut (40).

The electromagnetic brake (31) is located at the rear of the lifting motor (30) and locks the motor shaft when the power is cut off, preventing it from rotating. The motor's output rotational power is transmitted through the planetary reducer and reduction box to the ball screw (39). The screw nut (40) is fixedly connected to the stop ring (41). Since the stop ring (41) is adapted to the outer tube, it cannot rotate but can move axially within the outer tube (36). When the ball screw (39) rotates, the screw nut (40) moves axially. The inner tube (37) is fixedly connected to the screw nut (40) and can move with it. The front-end joint (38) is fixedly connected to the inner tube (37), enabling the front-end joint to perform telescopic actions relative to the shaft sleeve (35). The short shaft (23) is inserted into the shaft sleeve (35) to hinge the lifting rod and the follower arm.

Figure 8:
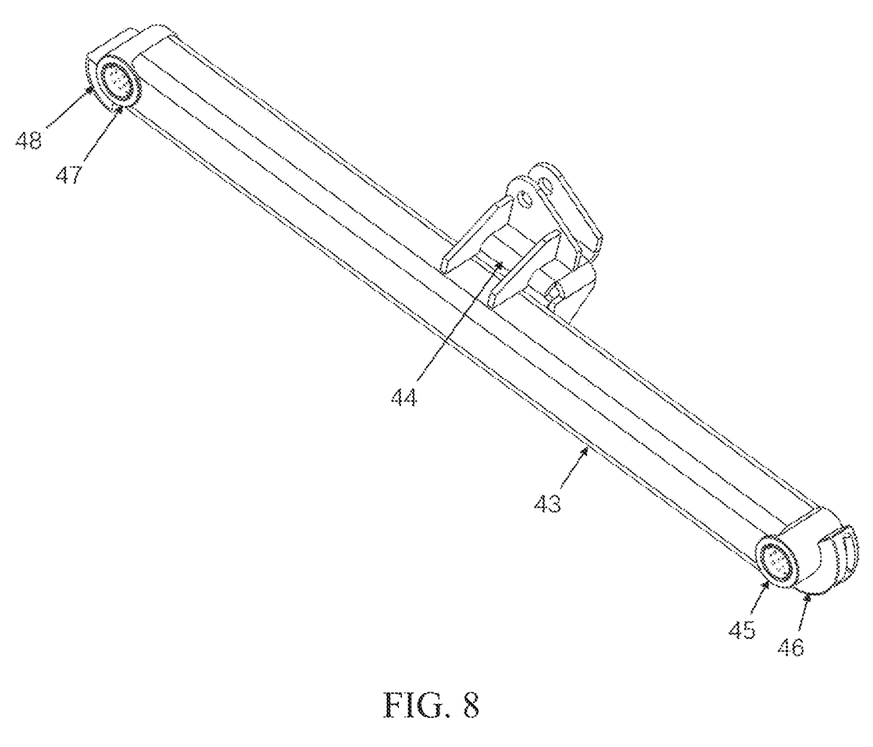
FIG. 8 is a structural view of the fixed beam.

The fixed beam (05) provides structural support and stability to the tailgate mechanism. As shown in FIG. 8, the right-side fixed beam includes a square tube (43) as its main support structure, a door push rod installation seat (44) for connecting the door push rod (06), a bottom rotation sleeve (45) for pivoting, a cylindrical cam (46) for guiding movement, a top rotation sleeve (47) for additional pivoting support, and a buffer ring (48) for absorbing shocks. The buffer ring (48) is detachably fixed to the rotation sleeve (45), allowing for easy replacement if needed, while the other parts are fixedly welded together for durability. The left-side fixed beam is similar in structure to the right-side fixed beam but does not include the door push rod installation seat (44), making it symmetrical and balanced.

Figure 9:
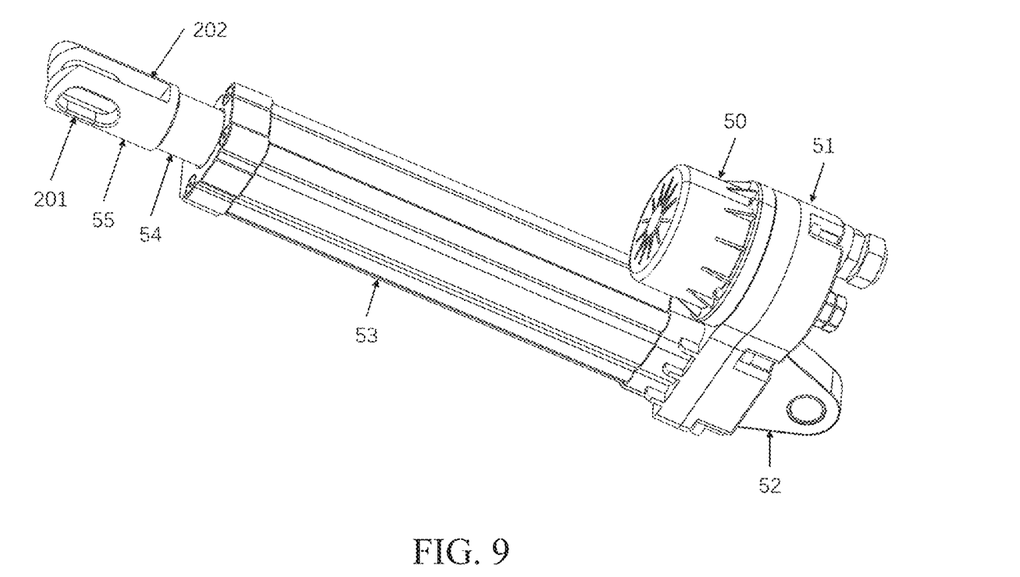
FIG. 9 is a structural view of the door push rod.

As shown in FIG. 9, the door push rod (06) is essential for controlling the opening and closing of the tailboard. It includes the door motor (50), which powers the mechanism; the door reduction box (51), which reduces the motor speed and increases torque; the rear-end joint (52), which connects to the fixed beam (05); the outer door tube (53) and inner door tube (54), which telescope to allow for movement; and the front-end door joint (55), which connects to the bearing platform (09). The front-end door joint (55) features a long circular hole (201) and a groove (202), providing flexibility in movement and adjustment. The rear-end joint (52) is hinged to the door push rod installation seat (44) on the fixed beam (05), while the front-end door joint (55) is movably hinged to the bearing platform (09) via a pin shaft (85), allowing for controlled opening and closing movements.

Figure 10:
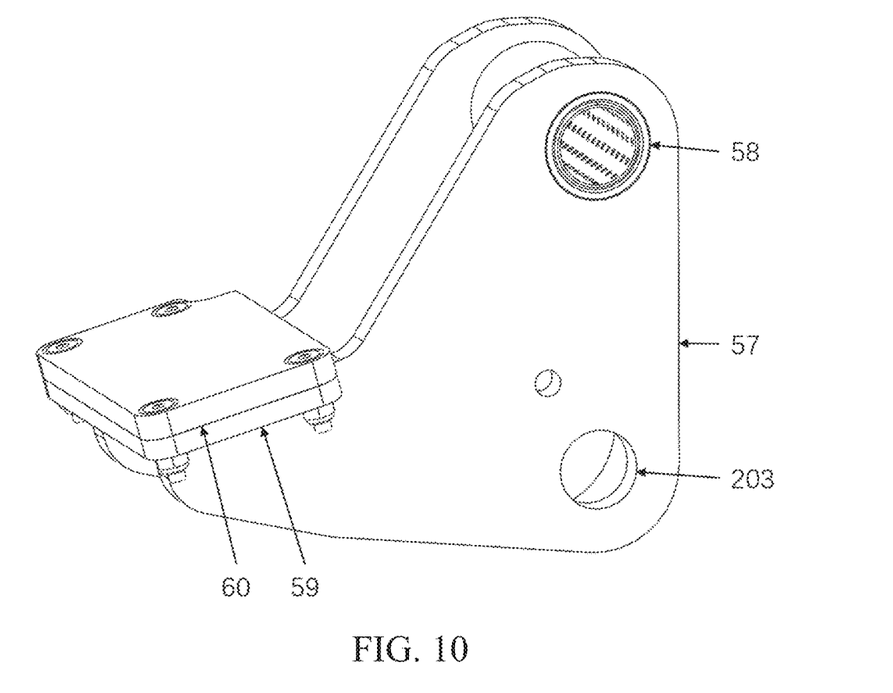
FIG. 10 is a structural diagram of the lifting seat.

As shown in FIG. 10, the lifting seat (07) provides support and stability during the lifting process. It consists of two lifting plates (57), a lifting shaft sleeve (58), and a connecting plate (59), all fixedly welded together to form a robust structure. A buffer block (60) is fixedly connected to the connecting plate (59), providing shock absorption during operation. The lower part of the lifting plate (57) is equipped with a fixed beam hinge hole (203), which aligns with the bearing platform (09) to ensure stability and prevent tipping.

Figure 11:
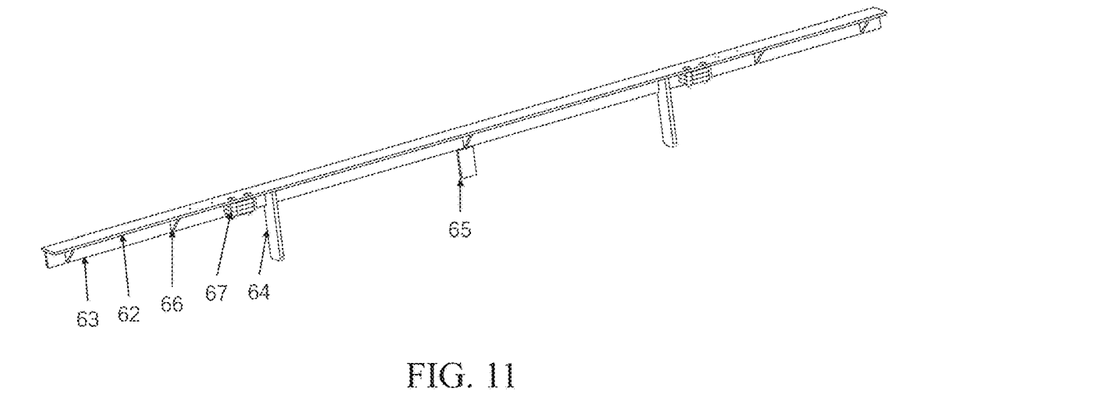
FIG. 11 is a structural diagram of the connecting plate.

As shown in FIG. 11, the connecting plate (08) ensures a secure connection between the tailboard and the vehicle. It includes an upper connecting surface plate (62), which aligns with the bearing platform (09); a vertical plate (63), which provides structural support; a support plate (64) and middle support plate (65), which strengthen the connection; a triangular reinforcement plate (66), which adds durability; and a buffer block (67), which prevents the connecting plate (08) from damaging the vehicle compartment. The support plate (64) and middle support plate (65) are fixedly welded to the lifting beam (03), ensuring a solid connection. When the tailboard is raised to the correct position, the buffer block (67) first contacts the vehicle compartment, preventing the connecting plate (08) from colliding with the compartment.

Figure 12:
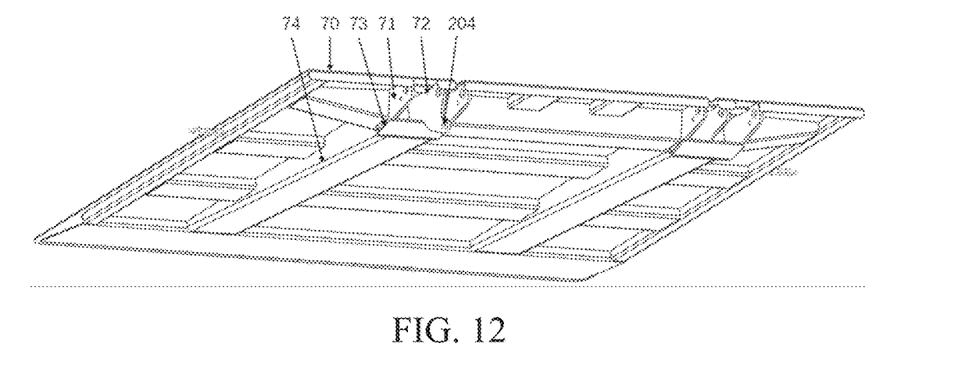
FIG. 12 is a structural diagram of the bearing platform.

As shown in FIG. 12, the bearing platform (09) is a crucial component that supports the load during operation. It includes a panel (70), which forms the main surface of the platform; a platform hinge plate (71) and platform door plate (72), which provide hinge points for movement; a platform support plate (73), which offers additional structural support; and a platform main beam (74), which strengthens the entire structure. These components are all fixedly welded together to ensure stability. The lifting beam (03) and the lifting seat (07) are hinged to the platform through the circular holes in the platform hinge plate (71) and platform door plate (72), allowing for controlled movement. The platform support plate (73) rests against the buffer block (60) on the lifting seat (07), maintaining the balance of the bearing platform (09) after the front end of the platform leaves the ground. The platform door plate (72) is equipped with a door circular hole (204), which aligns with the hinge points to ensure smooth operation.

Figure 13:
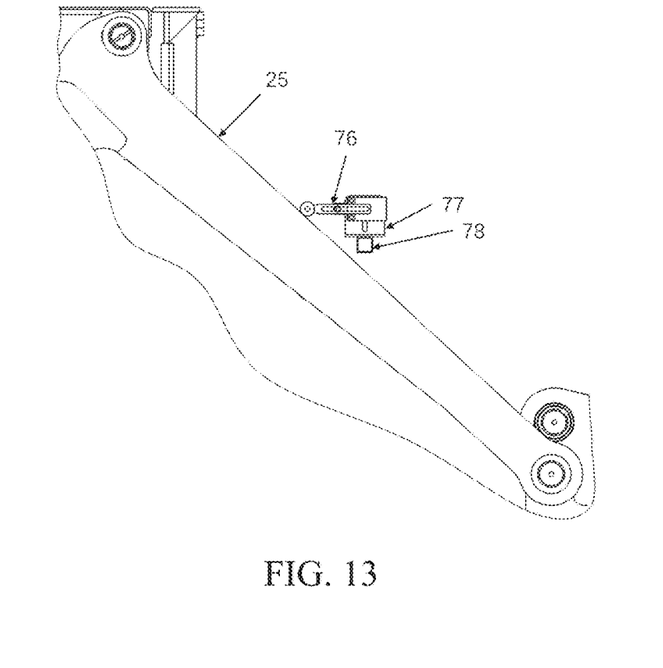
FIG. 13 is a diagram of the lifting trigger.

As shown in FIG. 13, the lifting trigger (10) is a key safety feature that controls the lifting mechanism. It includes a lifting travel switch (76), which detects the position of the tailboard; a switch installation plate (77), which securely holds the switch in place; and an installation square tube (78), which provides additional support. The switch installation plate (77) is fixedly connected to the vehicle, ensuring that the lifting trigger (10) remains in the correct position. When the tailboard is lifted to be level with the vehicle compartment, the lifting plate (25) activates the lifting travel switch (76), sending an electrical signal to stop the lifting motor and prevent overextension.

Figure 14:
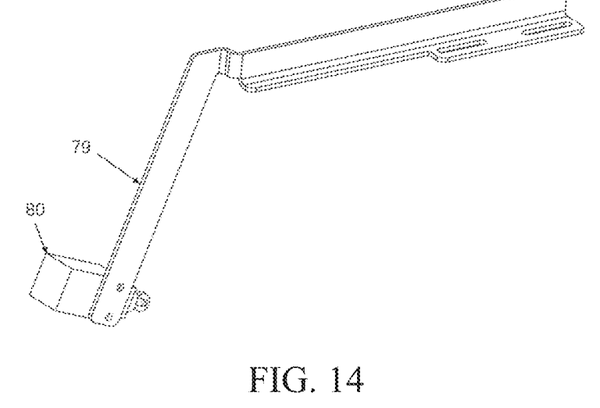
FIG. 14 is a diagram of the ground contact trigger.

As shown in FIG. 14, the ground contact trigger (11) is a crucial component that prevents damage by detecting when the tailboard reaches the ground. It includes a ground contact installation frame (79), which securely holds the trigger in place, and a ground contact travel switch (80), which detects the tailboard's position relative to the ground. The ground contact travel switch (80) is fixedly connected to the ground contact installation frame (79), ensuring accurate detection. The installation frame (79) is adjustable and fixedly connected to the square beam (13), allowing for precise positioning.

Figure 15:
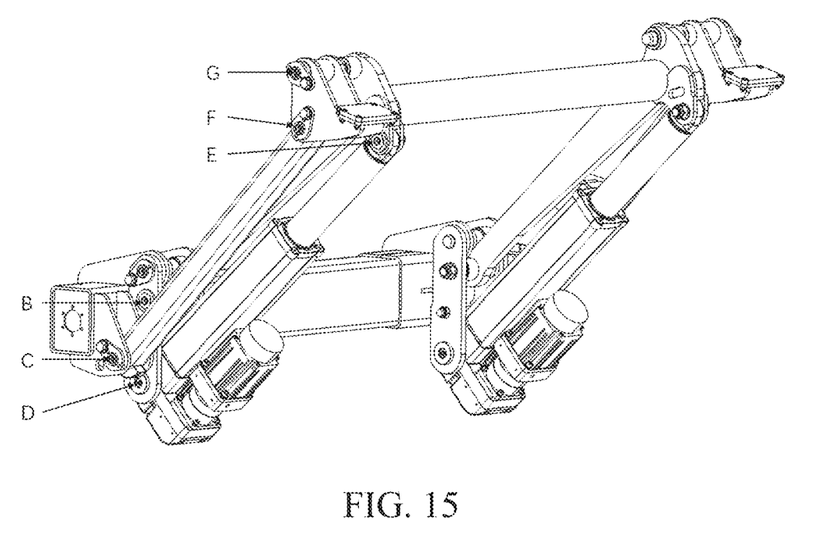
FIG. 15 is a diagram of the lifting system.

As shown in FIG. 15, the follower arm (02) works in tandem with the large beam assembly (01) to control the lifting and lowering of the tailboard. When the follower arm (02) is closely attached to the square beam (13), the hinge points BCFG in the side projection of the tailboard form a parallelogram. This configuration ensures that the angle of the lifting seat (07) relative to the large beam assembly (01) remains unchanged during lifting and lowering. The hinge points BDE form a triangle, and by extending or retracting the lifting rod (04), the lifting beam (03) rotates around hinge point B, enabling the lifting and lowering of the tailboard with precision.

The platform door plate (72) is designed to align with the bearing platform (09) and other components during operation. It is positioned within the groove (202) of the front-end door joint (55), allowing for smooth movement. A door pin shaft (106) passes through the door circular hole (204) on the platform door plate (72) and is inserted into the long circular hole (201) of the front-end door joint (55). When the bearing platform (09) is lifted to a high position, the extension of the door push rod (06) causes the bottom end of the long circular hole (201) to contact the door pin shaft (106), pushing the bearing platform (09) to rotate upward around the hinge point G, causing the platform support plate (73) and buffer block (60) to separate. This movement ensures that the platform can be securely closed without damaging the components.

When the platform support plate (73) and the buffer block (60) are in contact, the door circular hole (204) on the platform door plate (72) aligns coaxially with the fixed beam hinge hole (203) on the lifting plate (57), meaning points F and J are aligned in the side projection of the tailboard. This alignment ensures that the length of HJ (the length of the door push rod (06)) remains unchanged during the lifting and lowering of the tailboard, preventing damage to the door push rod (06) and ensuring smooth operation.

Figure 16:
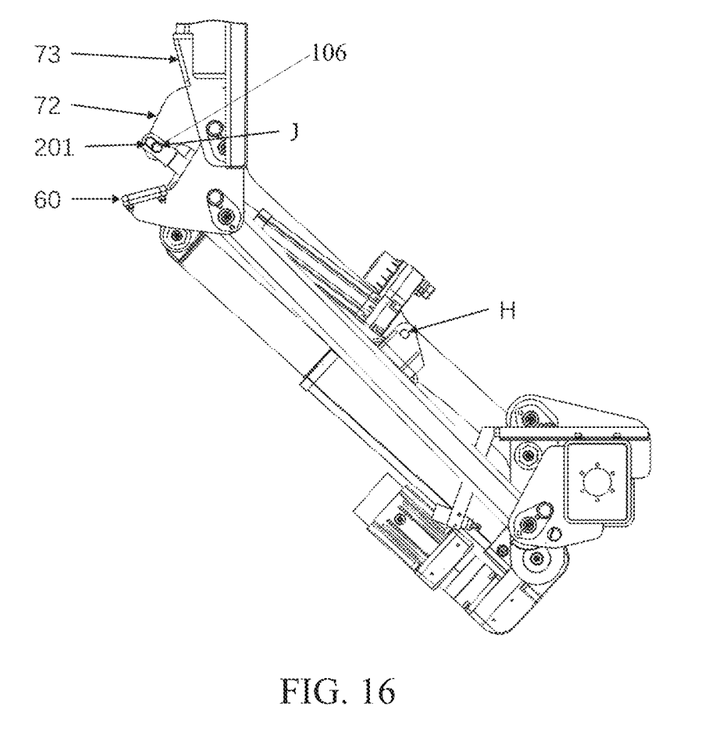
FIG. 16 is a diagram of the closed state of the tailgate.

As shown in FIG. 16, during the closing operation, the door push rod (06) shortens to control the downward rotation of the bearing platform (09). However, due to control and manufacturing precision issues, it cannot be ensured that the door push rod (06) will stop with the door circular hole (204) exactly coaxial with the fixed beam hinge hole (203). If the shortening is insufficient, the bearing platform (09) may not make proper contact with the lifting seat (07), causing the load pressure on the bearing platform (09) to be borne by the door push rod (06), which could easily damage it. On the other hand, if the rod shortens too much, there will always be an internal force between the door push rod (06), the fixed beam (05), the lifting seat (07), and the bearing platform (09), which is detrimental to the normal operation of the mechanism and will reduce its lifespan.

To address this, the design includes a long circular hole (201). After the door is fully closed, the door push rod (06) can continue to shorten slightly, allowing the bottom end of the long circular hole (201) to separate from the pin shaft (85). When the door starts to close again, the door push rod (06) will first extend by this length before pushing the bearing platform (09) to rotate upward. Additionally, the long circular hole (201) design provides a degree of freedom in the connection between the bearing platform (09) and the door push rod (06) during the tailboard's lifting and lowering. Since the buffer block (60) is made of elastic material, it undergoes slight deformation under stress, causing the platform door plate (72) to rotate slightly around point G. The long circular hole (201) design ensures that this rotational movement does not affect the door push rod (06), preventing undue stress on the components.

Figure 17:
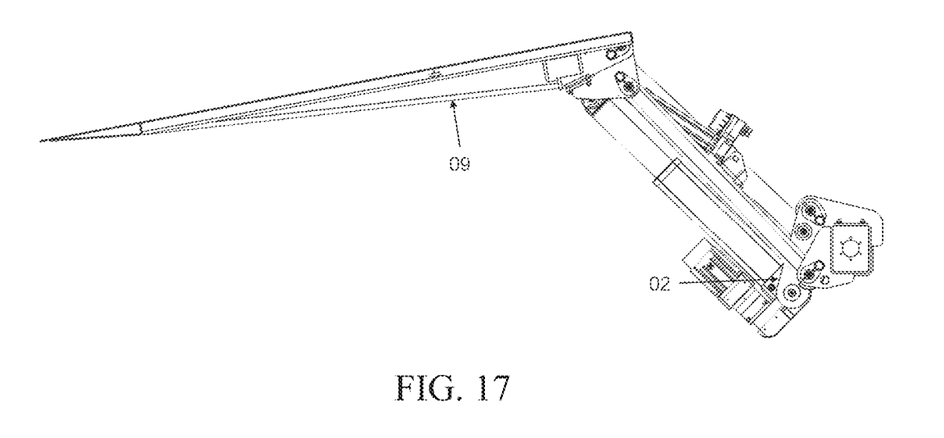
FIG. 17 is a diagram of the tipping state of the bearing platform during lifting.

As shown in FIG. 17, the follower mechanism has a risk of tipping over, and when tipping occurs, the lower end of the follower arm (02) will open away from the large beam assembly (01). Based on the force analysis of the rod mechanism, the closer point A is to point B in the vertical direction, the less likely the bearing platform (09) is to tip over during the entire lifting process. In the horizontal direction, the closer point A is to the large beam assembly (01), the less likely the bearing platform (09) is to tip over at lower positions, but the more likely it is to tip over at higher positions.

According to one embodiment, in the vertical direction, point A is positioned as close as possible to point B, while in the horizontal direction, point A is appropriately closer to the large beam assembly (01). This positioning ensures that when the tailboard is at a low position, applying a load within the cargo area of the platform will not cause it to tip over, and at higher positions, it provides some degree of anti-tipping functionality.

Figure 18:
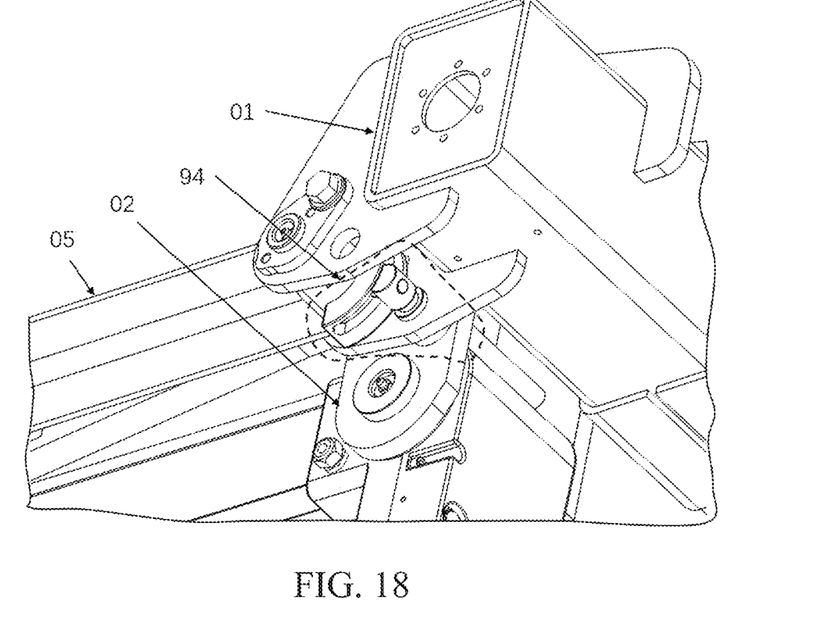
FIG. 18 is a diagram of the position of the follower cam latch mechanism.
Figure 19:
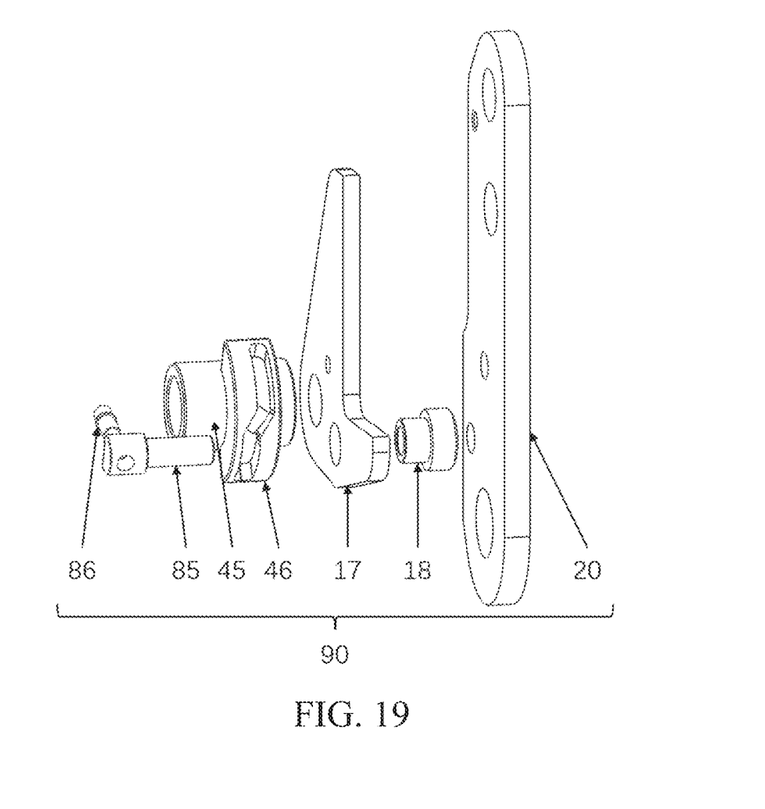
FIG. 19 is an exploded view of the follower cam latch mechanism.
Figure 20:
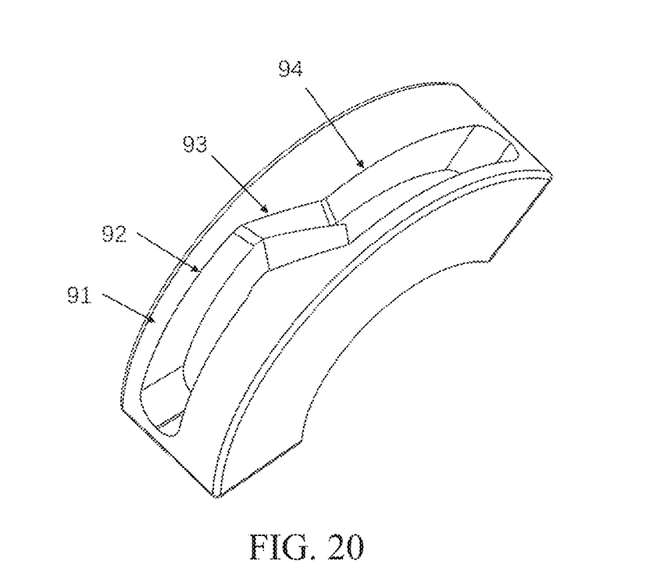
FIG. 20 is a structural diagram of the cylindrical cam.
Figure 21:
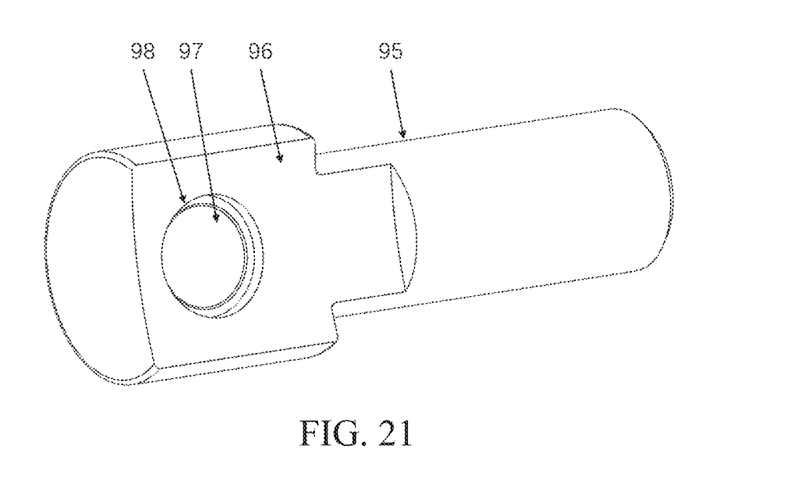
FIG. 21 is a structural diagram of the pin shaft.
Figure 22:
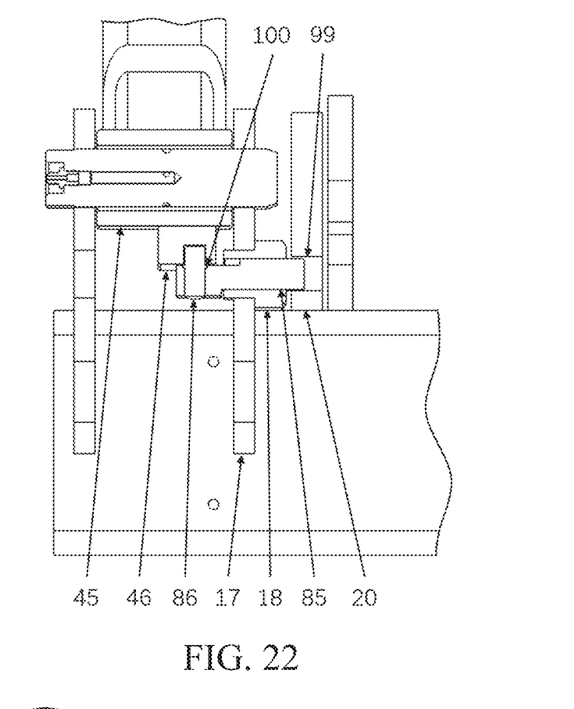
FIG. 22 is a transverse sectional view of the follower cam latch mechanism.
Figure 23:
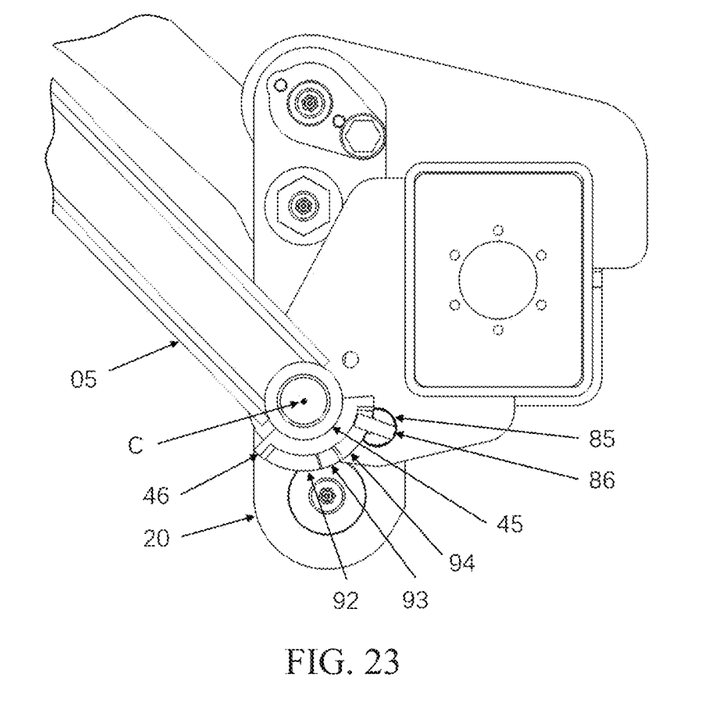
FIG. 23 is a longitudinal sectional view of the follower cam latch mechanism.

According to another embodiment, a follower cam latch mechanism 90 is provided, as shown in FIG. 18. This mechanism is located within the grooves of the two fixed beam installation plates (17). It uses the rotation of the fixed beam (05) as a power source to engage and disengage the follower arm (02) from the large beam assembly (01), ensuring that the follower arm (02) stays securely in place when needed.

The follower cam latch mechanism 90 includes the following components: fixed beam installation plate (17), pin shaft sleeve (18), outer follower arm (20), bottom rotation sleeve (45), cylindrical cam (46), pin shaft (85), and cam pin (86). These components work together to lock and unlock the follower arm (02), preventing unwanted rotation during operation.

As shown in FIGS. 19 to 23, the cylindrical cam (46) is designed with several features to control the movement of the pin shaft (85). It includes an outer cylindrical surface (91), a front groove (92), a push groove (93), and a rear groove (94). The pin shaft (85) is equipped with a pin head (95), an inner cylindrical surface (96), a cam pin hole (97), and a recessed platform (98). The outer follower arm (20) is designed with an open circular hole (99) to accommodate the pin shaft (85), while the cam pin (86) is equipped with a protrusion (100) that locks into place within the cylindrical cam (46), ensuring precise movement.

The cylindrical cam (46) is fixed to the fixed beam (05) and can rotate around the axis at point C. The pin head (95) of the pin shaft (85) is inserted into the pin shaft sleeve (18), allowing it to move in and out. One end of the cam pin (86) is inserted into the groove of the cylindrical cam (46), while the other end is tightly fitted into the cam pin hole (97) of the pin shaft (85). The protrusion (100) on the cam pin (86) locks into the recessed platform (98), fixing it axially. When the outer follower arm (20) is in contact with the square beam (13), the open circular hole (99) on it aligns concentrically with the pin shaft sleeve (18), allowing the pin head (95) to be inserted, ensuring secure operation.

When the buffer ring (48) of the bearing platform (09) touches the ground, the cam pin (86) is located in the front groove (92) of the cylindrical cam (46). As the tailboard rises slightly, the rotation of the fixed beam (05) causes the push groove (93) to contact the cam pin (86), pushing it inward and causing the pin shaft (85) to move, thereby inserting the pin head (95) into the open circular hole (99) of the outer follower arm (20). This continues until the rear groove (94) rotates to the position where the cam pin (86) is located, after which the cam pin (86) no longer moves with the rotation of the fixed beam (05). Conversely, when the tailboard descends and reaches a certain height, the pin head (95) will disengage from the open circular hole (99) of the outer follower arm (20), allowing the tailboard to perform the lowering action without interference.

The follower cam latch mechanism ensures that the lower end of the follower arm (02) cannot open by inserting the pin shaft (85) into the outer follower arm (20), preventing the bearing platform (09) from tipping over. The tailboard is designed to avoid tipping at lower heights, and before it reaches a height where tipping might occur, the follower arm (02) is latched to the large beam assembly (01), ensuring that the tailboard remains stable throughout the operation.

To accommodate the installation of the same tailboard on vehicles with different heights, the length of the lifting rod (04) varies depending on the installation height, allowing for proper ground contact.

To adapt to sloped road surfaces at the rear end of the vehicle, the design of the tailboard typically allows for a certain degree of downward tilt after the buffer ring (48) touches the ground and the front end of the bearing platform (09) contacts the ground. This ensures that when there is a downward slope at the rear of the vehicle, the front end of the bearing platform (09) can still make contact with the ground, facilitating cargo transport. Conversely, when there is an upward slope at the rear of the vehicle, the tilt angle of the bearing platform (09) as it contacts the ground is smaller. Therefore, the downward tilt angle at which the front end of the bearing platform (09) contacts the ground differs depending on the road surface conditions.

Figure 24:
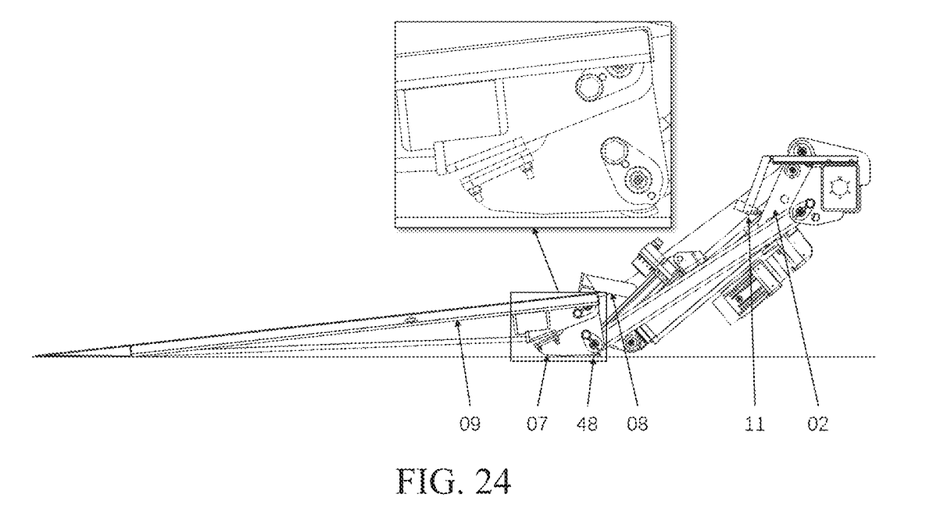
FIG. 24 is a diagram of the separated state of the lifting seat and the bearing platform.

If the bearing platform (09) makes contact with the ground and stops tilting before reaching its maximum tilt angle, and the lifting rod (04) continues to shorten, the follower arm (02) will continue to open, causing the lifting seat (07) to separate from the bearing platform (09), as shown in FIG. 24.

The principle of this solution is to detect the maximum angle at which the follower arm (02) opens relative to the frame, which corresponds to the maximum tilt angle of the front end of the bearing platform (09). The ground contact trigger (11) includes the ground contact installation frame (79) and the ground contact travel switch (80).

During the installation of the tailboard on the truck, the position of the ground contact trigger (11) on the large beam assembly (01) can be adjusted. When the buffer ring (48) touches the ground, the lifting rod (04) is controlled to shorten to the minimum length allowed by the system, ensuring that the ground contact trigger (11) is just activated at that moment.

The indirect ground detection mechanism indirectly controls the angle of the lifting seat (07) relative to the large beam assembly (01) by detecting and controlling the maximum angle at which the follower arm (02) opens. Due to the hinged and contacting relationship between the bearing platform (09) and the lifting seat (07), the two can rotate and separate in one direction.

After the tailboard descends and the buffer ring (48) touches the ground, the lifting rod (04) continues to shorten, gradually opening the follower arm (02). If the front end of the bearing platform (09) contacts the ground before the follower arm (02) triggers the ground contact travel switch (80), the state shown in FIG. 24 occurs, where the bearing platform (09) separates from the lifting seat (07) until the follower arm (02) opens to its maximum angle, and the ground contact travel switch (80) stops the system.

Figure 25:
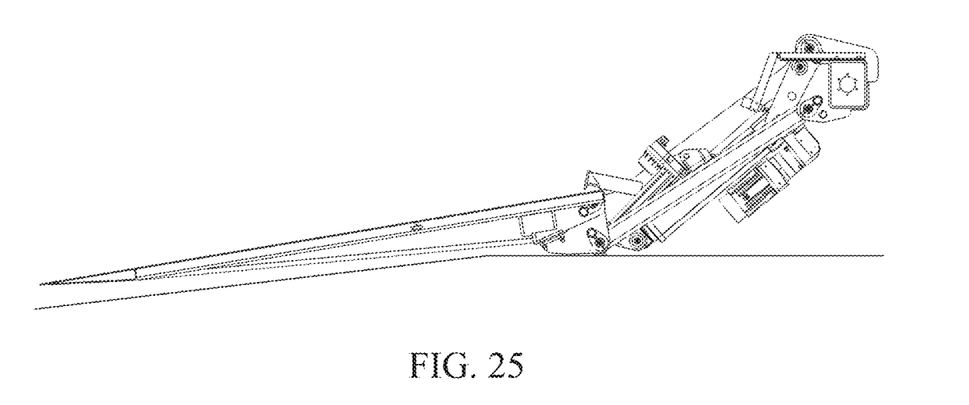
FIG. 25 is a diagram of the state when the downward slope of the ground exceeds the permissible range.

If the follower arm (02) opens to its maximum angle and the bearing platform (09) still has not made contact with the ground, the system will stop as shown in FIG. 25. In this case, the slope angle of the road surface exceeds the maximum operating angle of the tailboard, preventing the bearing platform (09) from contacting the ground, but the system will correctly control the tailboard to stop without causing damage or malfunction.

As shown in FIG. 3, when the tailboard is lifted to be level with the vehicle compartment, the connecting plate (08) serves to connect the bearing platform (09) to the vehicle compartment. If there are protruding components at the rear of the vehicle, the corresponding sections of the connecting plate (08) can be cut out to maintain the integrity of the bearing platform (09).

As shown in FIG. 24, when the tailboard is on the ground, the connecting surface plate (62) of the connecting plate (08) will be higher than the bearing platform (09). When goods are pushed onto the bearing platform (09), the incline often requires significant forward momentum, which can cause the goods to overshoot and fall off the bearing platform (09). The elevated connecting surface plate (62) acts as a barrier, effectively preventing the goods from being pushed off the bearing platform (09) and falling.

In one alternative embodiment, the lifting rod (04) of the automobile lifting tailgate system is replaced with a hydraulic cylinder to enhance lifting power and precision. This hydraulic system is designed to integrate seamlessly with existing vehicle hydraulic systems, providing a smoother and more robust operation.

This design introduces an independent door push rod mechanism that handles the opening and closing of the tailgate without being involved in the lifting and lowering processes. By separating these functions, the mechanical demands on the door push rod are significantly reduced. The original bearing platform is divided into two parts: a new bearing platform and a lifting seat. These components are designed to rotate and separate, existing in either a connected or disconnected state. This separation allows the tailgate's door opening and closing actions to operate independently of the lifting and lowering actions, meaning they can be controlled separately without interference. The door push rod is hinged at one end to the fixed beam and at the other end to a coaxial hole shared with the hinge point between the bearing platform and the fixed beam. This configuration ensures that the door push rod does not need to move during the lifting and lowering of the tailgate. This design results in reduced mechanical demands on the door push rod and increased durability and reliability of the mechanism.

The anti-tipping design is aimed at ensuring the tailboard remains stable and is unlikely to tip, especially when it is in a lower position. This stability is achieved through a multi-link mechanism that prevents the follower tailboard from tipping when it is near the ground. Additionally, a cylindrical cam mechanism converts the rotational movement of the fixed beam into the linear movement of a locking pin. At higher positions, this locking pin engages to secure the follower arm, preventing the bearing platform from tipping over. The multi-link mechanism enhances stability at lower heights, while the cylindrical cam mechanism provides a reliable locking function that only engages when necessary. This design ensures the tailboard remains stable and safe during operation.

The indirect ground detection mechanism is designed to stop the tailboard's movement by detecting when the follower arm reaches its maximum angle. This method is particularly effective on uneven surfaces, such as uphill and downhill slopes, and is adaptable to vehicles where the same tailboard is installed at different heights. Unlike direct detection methods that sense contact between the bearing platform and the ground, this indirect approach offers higher accuracy and is less influenced by unknown ground conditions. Additionally, because the sensors are not exposed to harsh environmental factors, they are more durable. This design provides a more accurate and reliable way to detect the tailboard's position relative to the ground, ensuring safe and effective operation in a variety of conditions.

The connecting plate in this design serves dual purposes depending on the tailboard's position. When the tailboard is raised to be level with the vehicle compartment, the connecting plate ensures a secure connection between the bearing platform and the vehicle. However, when the tailboard is in a lower position during loading operations, the connecting plate acts as a barrier to prevent cargo from sliding off the platform. Additionally, the connecting plate can be customized with cutouts to accommodate any protruding components at the rear of the vehicle, ensuring the integrity of the bearing platform is maintained. This dual-function design enhances both the safety and functionality of the tailboard, making it versatile and adaptable to different vehicle configurations.

What is claimed is:

1. A tailgate system for an automobile, comprising:
a bearing platform;
a beam assembly, configured for being fixed on an automobile;
a follower arm hinged to said beam assembly, configured for guiding a raising and lowering movement of the bearing platform;
a lifting beam hinged to said follower arm, wherein the lifting beam rotates as the follower arm moves;
a connecting plate fixedly attached to said lifting beam;
a fixed beam hinged to said beam assembly;
a lifting seat connected to said fixed beam and supported by the fixed beam, and;
a door push rod, wherein the door push rod comprises a rear end joint hinged to the fixed beam, a front end joint hinged to the bearing platform, and a motor configured for driving the front end joint to retract or extend, thereby controlling a rotation of the bearing platform.

2. The tailgate system of claim 1, wherein a door circular hole is provided on the bearing platform, a hinge hole is provided on the fixed beam, the door circular hole aligns coaxially with the hinge hole when the bearing platform is at a predetermined position, and an end of the door push rod is hinged in the hinge hole, allowing the door push rod to remain stationary while the bearing platform moves.

3. The tailgate system of claim 2, wherein the front-end joint is provided with a circular hole and a groove configured to accommodate dimensional deviations caused by misalignment during extension or retraction of the door push.

4. The tailgate system of claim 1, wherein said bearing platform and lifting seat are configured to rotate independently.

5. The tailgate system of claim 1, wherein said bearing platform and lifting seat are connected in such a way that they can automatically transition between connected and disconnected states based on the position of the bearing platform.

6. The tailgate system of claim 1, further comprising a cylindrical cam mechanism connected to said fixed beam, wherein the cylindrical cam mechanism is configured to convert a rotational movement of the fixed beam into linear movement of a locking pin, which engages with the follower arm to prevent the bearing platform from tipping when the bearing platform is raised.

7. The tailgate system of claim 6, wherein the locking pin is configured to automatically disengage from the follower arm when the bearing platform is lowered.

8. The tailgate system of claim 1, further comprising a ground contact trigger configured for detecting a position of the bearing platform relative to the ground and sending an electrical signal to stop overextension of the door push rod.

9. The tailgate system of claim 8, wherein the ground contact trigger comprises a lifting travel switch, a switch installation plate and an installation square tube, the lifting travel switch is configured for detecting a position of the bearing platform, the switch installation plate holds the lifting travel switch in place, and the switch installation plate is fixedly connected to the bearing platform.

10. The tailgate system of claim 1, wherein said connecting plate is designed to serve dual functions, acting as a connector at a first position to align the bearing platform with the automobile, and as a barrier at a second position to prevent cargo from sliding off the bearing platform when cargo is loaded thereon.

11. The tailgate system of claim 10, wherein the connecting plate comprises an upper connecting surface plate aligned with the bearing platform, a vertical plate supporting the upper connecting surface plate, supporting plates fixedly welded to the lifting beam, and a buffer block provided on the upper connecting surface plate to prevent the connecting plate from colliding with the automobile.

12. The tailgate system of claim 1, wherein said lifting seat is equipped with a buffer block, said buffer block being made of elastic material to absorb shocks and vibrations of the bearing platform and the lifting seat.

13. The tailgate system of claim 12, wherein the buffer block is positioned to engage with the lifting beam when the bearing platform is raised.

14. The tailgate system of claim 1, further comprising a follower cam latch mechanism driven by the fixed beam to engage the follower arm with the beam assembly or disengage the follower arm from the beam assembly.

15. The tailgate system of claim 14, wherein the follower cam latch mechanism comprises a cylindrical cam fixed to the fixed beam, a pin shaft sleeve, and a pin shaft, wherein the pin shaft comprises a pin head inserted into the pin shaft sleeve.

* * * * *